United States Patent [19]
Akemakou

[11] Patent Number: 6,051,904
[45] Date of Patent: Apr. 18, 2000

[54] ROTARY ELECTRIC MACHINE, ESPECIALLY AN ALTERNATOR FOR A MOTOR VEHICLE

[75] Inventor: Dokou Antoine Akemakou, Vitry sur Seine, France

[73] Assignee: Valeo Equipments Electriques Moteur, Creteil, France

[21] Appl. No.: 09/166,202

[22] Filed: Oct. 5, 1998

[30] Foreign Application Priority Data

Oct. 7, 1997 [FR] France .................................. 97 12471

[51] Int. Cl.⁷ .................................................. H02K 17/42
[52] U.S. Cl. .......................... 310/171; 310/168; 318/701
[58] Field of Search .................... 310/171, 168, 310/152, 254, 181; 318/701

[56] References Cited

U.S. PATENT DOCUMENTS

| | | | |
|---|---|---|---|
| 3,862,445 | 1/1975 | Volkrodt | 310/154 |
| 4,011,479 | 3/1977 | Volkrodt | 310/186 |
| 4,348,605 | 9/1982 | Torok | 310/168 |
| 5,051,640 | 9/1991 | Freise | 310/162 |
| 5,117,144 | 5/1992 | Torok | 310/269 |
| 5,327,069 | 7/1994 | Radun et al. | 322/10 |
| 5,672,925 | 9/1997 | Lipo et al. | 310/154 |

FOREIGN PATENT DOCUMENTS

| | | |
|---|---|---|
| 0 394 527 | 10/1990 | European Pat. Off. . |
| 0707 374 | 4/1996 | European Pat. Off. . |
| 94/19855 | 9/1994 | WIPO . |

OTHER PUBLICATIONS

Patent Abstracts of Japan vol. 003, No. 139 (E–139 (E–152), Nov. 17, 1979 & JP 54 1166210 A (Hitachi Ltd), Sep. 11, 1979.

French Search Report dated Jul. 10, 1998.

*Primary Examiner*—Nestor Ramirez
*Assistant Examiner*—Joseph Waks
*Attorney, Agent, or Firm*—Morgan & Finnegan, LLP

[57] ABSTRACT

An electrical machine includes a stator and a rotor. The stator includes on its internal face at least one induction winding housed in a pair of recesses and a series of housings for excitation means. The rotor does not have windings and includes teeth for establishing variable magnetic fluxes in the induction winding. The excitation brings into play permanent magnets adapted to establish a closed circumferential magnetic flux in the stator and excitation windings locally establishing an adjustable magnetic flux in the reverse circumferential direction. The rotor teeth are adapted to effect a flux commutation in the stator and the, or each, permanent magnet occupies an angular position located between the angular positions of the two arms of a common induction winding. In this way an alternating magnetic flux is produced in the induction winding or windings during the rotation of the rotor.

19 Claims, 3 Drawing Sheets

ROTARY ELECTRIC MACHINE, ESPECIALLY AN ALTERNATOR FOR A MOTOR VEHICLE

FIELD OF THE INVENTION

The present invention relates generally to rotary electric machines such as alternators for automobile vehicles.

The polyphasic generator which comprises a conventional alternator for an automobile vehicle usually consists of a stator inside which a rotor equipped with an excitation winding rotates. The winding is supplied with current through contact brushes in contact with two collector rings provided on a projecting part of the rotor shaft.

The use of brushes, however, causes disadvantages, including an increase in axial length of the alternator, the need for an assembly of brushes and collectors which increases the manufacturing cost, and the risk of operating faults caused by a lack of contact between the brushes and the collector rings, usually caused by wear.

BACKGROUND OF THE INVENTION

There are some proposals in the art which envisage the use of rotary electric machines, able to act as automobile vehicle alternators, which do not incorporate brushes.

Thus an alternator is known in which the gripping devices of the two field wheels of the rotor, which normally extend into one another, are truncated in such a manner as to allow a support for a fixed excitation winding, located inside the field wheels, to pass through in a transverse plane. However, this approach is used to the detriment of the output of the machine, because the air gap surfaces are then very substantially decreased. Moreover, a machine of this type, for a given output/speed curve, is substantially heavier than a conventional machine, and this is particularly disadvantageous in the case of alternators installed in vehicles.

An alternator is also known in which two field wheels with imbricated gripping devices are mounted in a cantilevered manner from an axial end of the machine, between a fixed, internal excitation winding and external stator windings.

This known solution to the problem also has disadvantages, caused in particular by the fact that the axial size of the machine is necessarily increased as well as its weight. Moreover, the increase in size of the air gaps near the rotor decreases the output of the machine.

Furthermore, in the two cases described above, the design of the machine makes it absolutely essential to take account of the electromagnetic effects not only in the plane perpendicular to the axis of rotation, that is to say in two dimensions, but also in the direction of the axis, that is to say in the third spatial dimension.

This necessity for a three-dimensional design of the machine makes the modelling and optimization of the different parameters extremely difficult and tedious.

Lastly, in particular from EP-0 707 374, a flux commutation structure is known which does not incorporate brushes, which has the advantage of being more easily designed and optimized in a purely bi-dimensional manner.

This known structure has, however, certain disadvantages when it is excited either solely by magnets or by magnets associated with excitation windings. In particular, in the first case the fact that the magnetic flux from which the induction current is produced is obtained solely from permanent magnets does not allow any control of the excitation of the machine. Such machines can therefore serve only with difficulty as alternators of automobile vehicles, the speed of rotation of which may be extremely variable. A known solution in this case is to use electronic power components to maintain the output voltage at a fixed value of about 14 volts. Taking into account the large currents involved, this solution results in a bulky device and much work is required for its production. Moreover, regulation of the stator current is not advantageous from the energy balance point of view, because it implies dissipation as a pure loss of part of the electric power produced by the alternator.

In the second case, a known solution to the problem consists of controlling the current supplied by the induction windings by switching the current in the excitation winding or windings. Reversal of the excitation current decreases the flux of the magnets at high speeds. Because the excitation current, is in this type of machine, by nature a bi-directional alternating current, such commutation requires the use of an "H" shaped commutation bridge, which is expensive.

Furthermore, if it is intended to combine this magnetic excitation flux created by permanent magnets with a complementary excitation flux created by windings, then there are problems in obtaining a zero, or substantially zero, induction current which is desirable especially during a cut-off of voltage to the electrical equipment supplied by the alternator.

A synchronous machine with heteropolar excitation is also known from EP-A-0 394 527, based on the principle of variable reluctance, which makes it possible to combine an excitation by magnets and an excitation by windings to make the excitation vary from a substantially zero value to a maximum value. However, such a machine by nature creates a flux in the induction windings which is always directed in the same direction. The iron is thus used in a non-optimal manner: at the same saturation limit, the variation in useful flux is reduced in a ratio of about 1.15 to 1.2 relative to conventional flux commutation machines, which makes it necessary to add more induction conductors and so to increase the size of the machine.

DISCUSSION OF THE INVENTION

The present invention aims to overcome these disadvantages and proposes a rotating machine, in particular an alternator, in which the control of the current supplied is achieved by acting on the excitation and in which, despite the use of permanent magnets to obtain this excitation, the latter is varied between zero, or substantially zero, excitation, and a maximum value.

Another object of the invention is to produce a machine in which the excitation varies within the above-mentioned limits as a result of the application of an excitation current which itself varies between a zero value and a maximum value.

Accordingly, the present invention provides an electrical machine comprising a stator and a rotor, the stator comprising on its internal face at least one induction winding housed in a pair of recesses and also comprising a series of housings for excitation means. The rotor possesses no windings and comprises a plurality of teeth adapted to selectively establish variable magnetic fluxes in the induction windings and the excitation means comprise at least one permanent magnet adapted to establish a magnetic flux looping round itself in a circumferential direction of the stator, and at least one excitation winding adapted to establish locally an adjustable magnetic flux in the reverse circumferential direction to that of the flux produced by the magnet or magnets, wherein the teeth of the rotor are adapted to effect a flux commutation in the stator and in that the, or each, permanent magnet occupies an angular position located between the angular positions of the two arms of a common induction winding so as produce an alternating magnetic flux in the induction winding or windings during the rotation of the rotor.

Preferred, but non-limiting, characteristics of a machine in accordance with the invention are as follows:

the stator comprises along its periphery an alternating plurality of permanent magnets and excitation windings;

the or each permanent magnet extends substantially over all the radial width of the stator;

the stator comprises a single body in which a deep associated recess is provided for the or each permanent magnet;

the stator comprises a plurality of body parts connected to one another by a plurality of permanent magnets;

the or each excitation winding is located in two recesses provided respectively in the internal surface and in the external surface of the stator;

the machine comprises the same number of permanent magnets, excitation windings and induction windings evenly spaced over the circumference of the stator;

the flux commutation teeth of the rotor have a different angular distribution to those of the induction windings so as to operate with polyphasic currents in the different induction windings;

the machine comprises means for establishing with the aid of the excitation winding or windings a reverse magnetic field for magnetization or remagnetization of the permanent magnet or magnets; and the machine comprises an automobile vehicle alternator.

Other characteristics, aims and advantages of the present invention will be apparent from the following detailed description of a preferred embodiment of the invention, given by way of example and with reference to the attached drawings.

DESCRIPTION OF THE PREFERRED EMBODIMENT OF THE INVENTION

Figure 1:
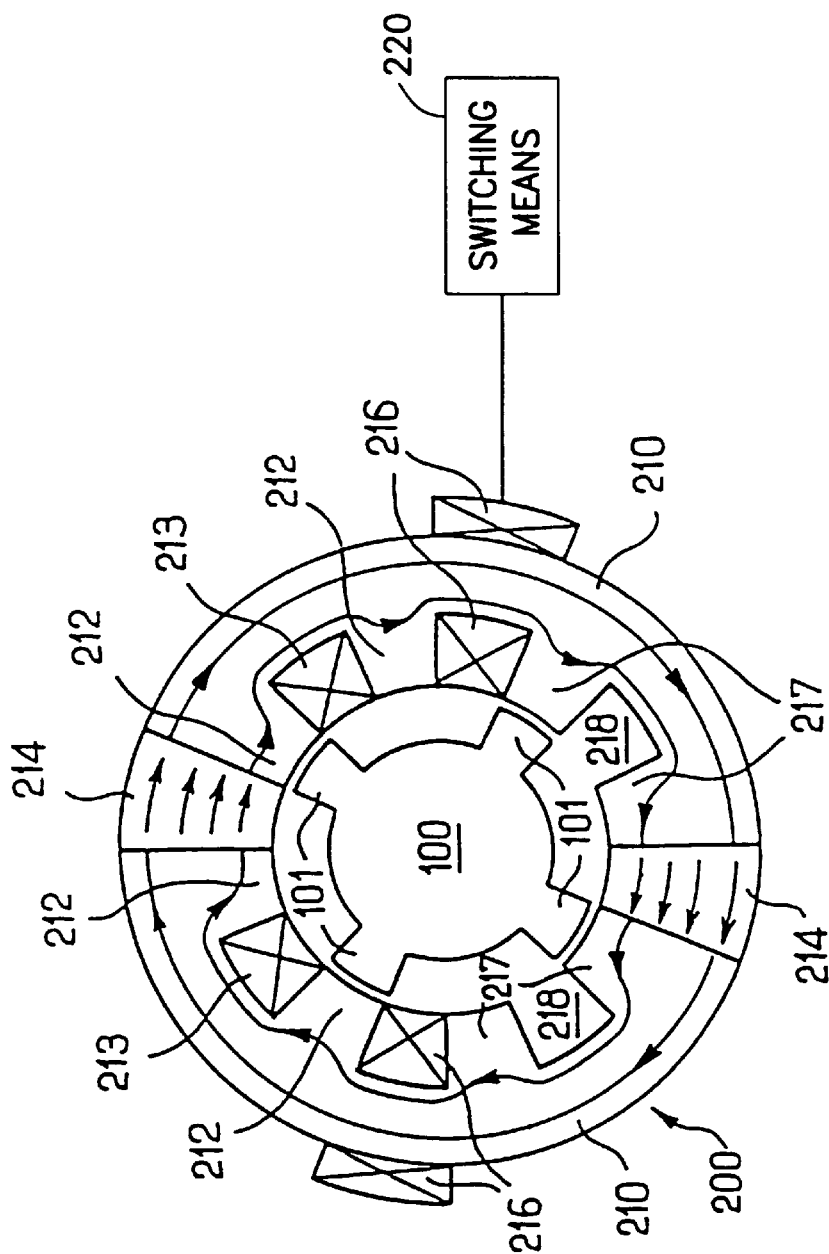
FIG. 1 is a diagrammatic view of a transverse cross-section of a rotor and stator assembly of a rotating machine according to a (simplified) embodiment of the invention, in a first state.
Figure 2A:
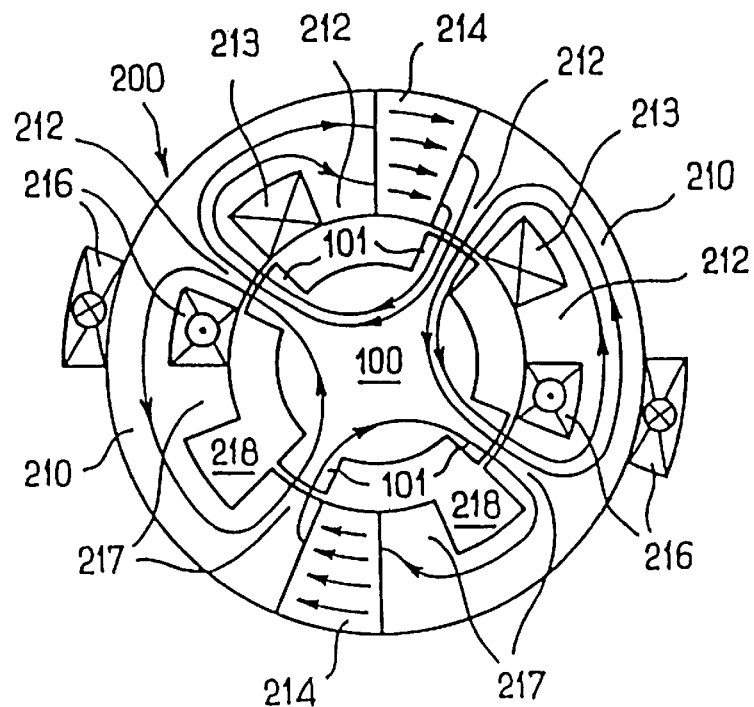
FIG. 2a shows the machine shown in FIG. 1 in a second state and with the rotor in a first position.
Figure 2B:
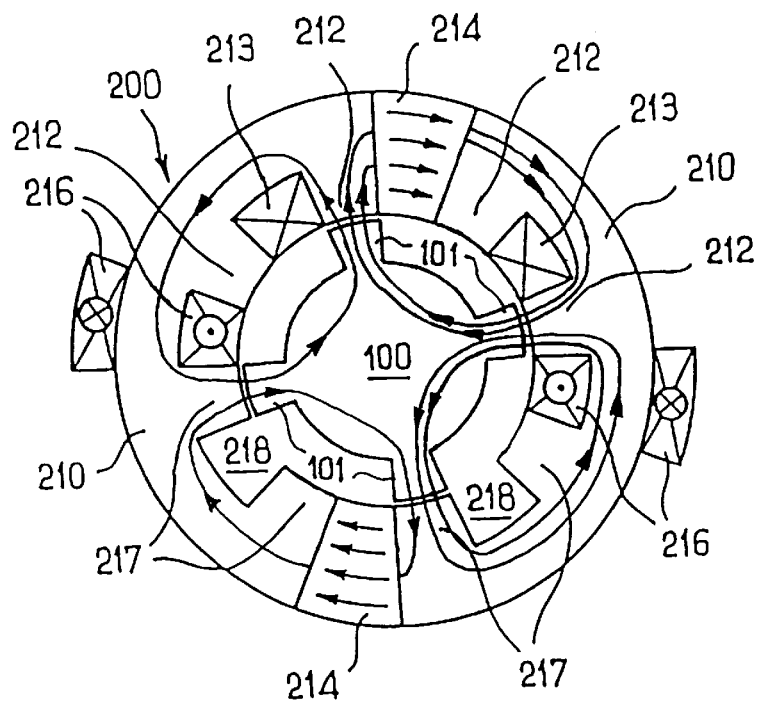
FIG. 2b shows the same machine in the same second state and with the rotor in a second position.

Referring first to FIGS. 1, 2a and 2b, these show a stator and a rotor which can be fitted to a single-phase flux commutation electrical machine in accordance with the invention.

The rotor 100 comprises on its periphery a plurality of projecting rotor teeth 101, in this particular case four in number, which preferably are evenly spaced at 90° to one another. As will be seen later, the teeth 101 have the role of flux commutation when the machine is excited.

For its part the stator 200 comprises an annular body 210 consisting of two parts which define, conjointly with two diametrically opposed permanent magnets 214, a continuous annular structure. In the internal periphery of the structure, and more particularly in the two parts of the body, a plurality of recesses are formed, in this case two groups of three recesses. The recesses may or may not be regularly spaced. In a clockwise direction starting from one of the permanent magnets (in this case that at the top of the Figure) there is a tooth 212 of the stator, a recess receiving one arm of an induction winding 213, a stator tooth 212, a recess receiving an arm of a first excitation winding 216, a stator tooth 217, an empty recess 218, another tooth 217 and lastly, the diametrically opposed permanent magnet 214. Continuing in the same direction, there are two other teeth 217 delimiting another empty recess 218, a recess housing an arm of a second excitation winding 216 and lastly two teeth 212 delimiting a recess for the other arm of the induction winding 213.

The stator also incorporates on its outer periphery the two other arms of the excitation windings, the latter being designed to produce a substantially tangential magnetic flux in the body 210 of the rotor 200. Similarly, the N/S orientation of the permanent magnets is such that they produce a substantially circumferential magnetic flux in the body in a clockwise direction in FIG. 1.

FIG. 1 shows the situation in which the excitation windings 216 are not supplied with any current.

The fact that the stator forms a closed body means that the two magnets 214 produce substantially circular magnetic field lines passing around the stator. As a result no part of the field will pass towards the rotor 100 (or only a negligible part), no matter what the angular position of the rotor may be, so that no current (except a negligible current) will be produced in the induction winding 213.

The excitation of the machine is therefore zero.

If, now (see FIGS. 2a and 2b) a unidirectional current is caused to circulate in the excitation windings so as to produce a magnetic flux in the opposite direction to that produced by the magnets 214, then the opposed fluxes will tend whenever, to be diverted through the teeth 101 of the rotor 100.

Thus FIG. 2a shows the case where the four teeth 101 of the rotor are positioned as follows, in a clockwise direction:

one directly in line with the stator tooth 212 separating the upper magnet 214 from an arm of the induction winding 213;

a second in line with a stator tooth 217 separating the internal arm of one of the excitation windings 216 from an empty recess 218;

a third in line with a tooth 217 separating the lower magnet 214 from the other empty recess 218;

and lastly a fourth in line with a tooth 212 separating the interior arm of the other excitation winding 216 from the other arm of the induction winding 213.

It will be seen that the field lines are then mostly directed across the teeth 101 of the rotor, which create four closed magnetic circuits. In the position shown in FIG. 2a, two of these fields circulate in opposite directions to one another and respectively circumscribe the two arms of the induction winding 213, returning into the rotor between the two said arms. These two magnetic circuits are excited respectively by the upper permanent magnet 214 and by the excitation winding 216 located on the right in FIG. 2a.

As a result, an induction current having a certain sign will be produced.

FIG. 2b shows the situation in which the rotor 100 has performed, relative to the case shown in FIG. 2a, a revolution of $2\pi/8$ or 45°. It will be seen that in this case the magnetic flux passes between the two arms of the induction winding 213 in the direction emerging from the rotor to produce an induction current having the opposite sign. Consequently, during the rotation of the rotor, an alternating, substantially sinusoidal induction current is produced in the induction coil, the mean value of which is zero or substantially zero.

It will be understood that the actual value of the alternating current depends on the amplitude of the magnetic field created by the excitation windings 216, to vary between a substantially zero value and a maximum value. It will be noted that the maximum value of the magnetic field in the excitation windings has not been precisely correlated to the power of the permanent magnets, being chosen simply so that the permanent magnets 214 remain able to prevent any significant inverse field.

An example of an embodiment of a multiphase machine in accordance with the present invention will now be described with reference to FIG. 3.

This machine, in this case a three-phase machine, comprises a stator 210 which is circumferentially continuous, made in a conventional manner by stacking metal sheets. The stator comprises twelve recesses having unequal depths but distributed angularly in a substantially regular manner, the said recesses being delimited by pairs of twelve teeth 212.

Figure 3:
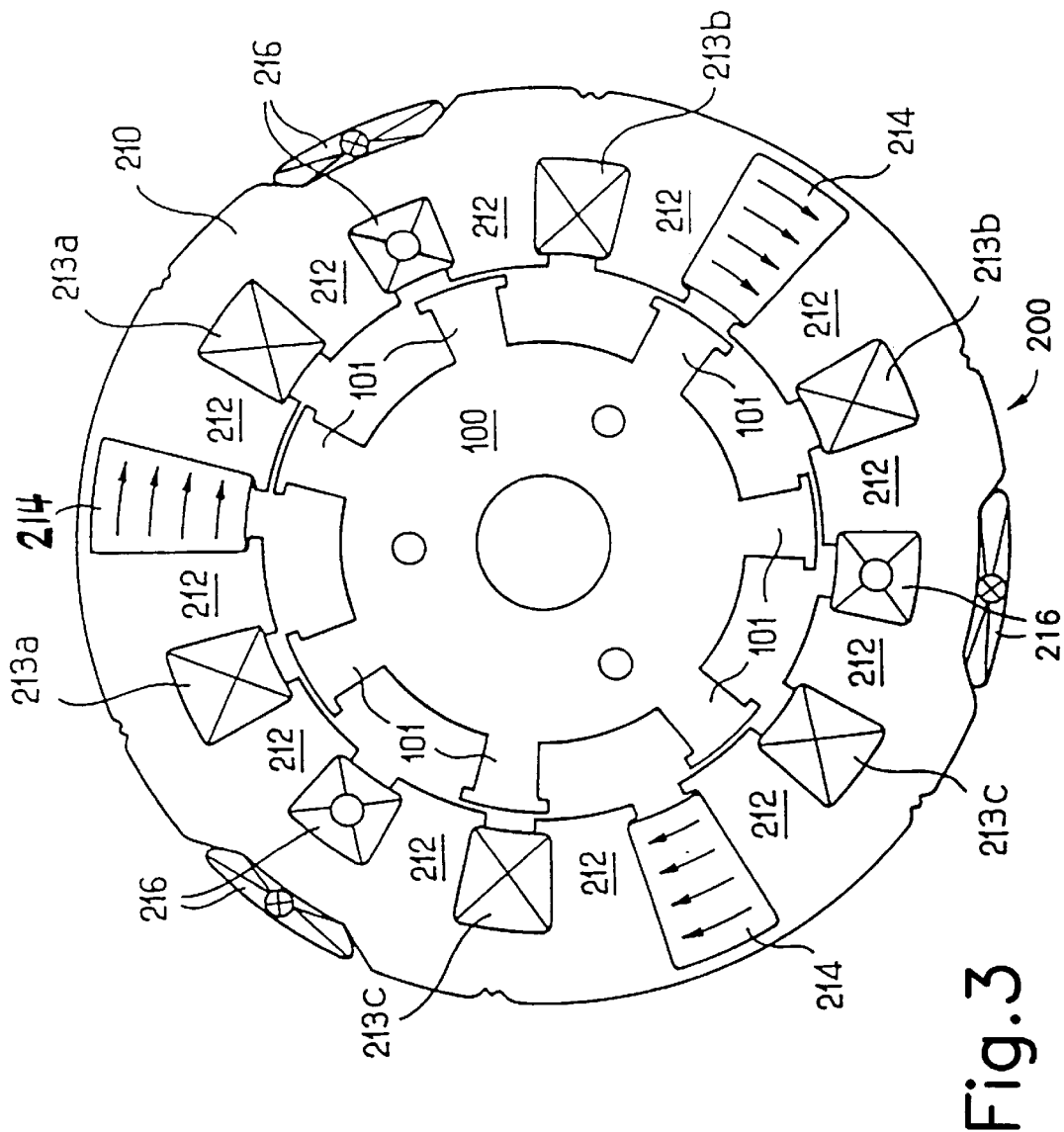
FIG. 3 is a view of a transverse cross-section of a rotor and stator assembly of a three-phase machine according to the invention.

Located in the various recesses, moving clockwise from the upper recess in FIG. 3 are:

a first permanent magnet 214,
an arm of a first induction winding 213a,
an arm of a first excitation winding 216,
an arm of a second induction winding 213b,
a second permanent magnet 214,
the other arm of the second induction winding 213b
an arm of a second excitation winding 216,
an arm of a third induction winding 213c,
a third permanent magnet 214,
the other arm of the third induction winding 213c,
an arm of a third excitation winding 216, and
the other arm of the first induction winding 213a.

The three permanent magnets are housed in recesses having a depth only slightly less than the thickness of the stator in the radial direction, in order to minimize the establishment of inverse fields near them in the stator when an excitation is produced. On the other hand, the recesses housing the excitation windings and the induction windings are less deep.

Moreover the three excitation windings 216 respectively have second arms formed in recesses made in the outer periphery of the stator body so as to produce substantially tangential excitation fluxes.

Thus the machine has a 120° angular symmetry, a similar structure being reproduced at three angular intervals each of 120°.

It will be understood that the three induction windings 213a, 213b and 213c constitute the three phases of the stator.

In order that the rotation of the rotor produces the desired electrical dephasing of 120° of these three phases, the rotor possesses a number and a distribution of teeth chosen in such a way that at each of the three respective phases the position of the pairs of teeth is different, with appropriate angular offsets.

This is preferably obtained by providing the rotor with seven flux commutation teeth 101 regularly spaced from one another by $2\pi/7$. Other distributions may also be envisaged.

It will also be noted that the width of the teeth is substantially identical to that of the teeth 212 separating the various recesses in the stator.

Furthermore, the three excitation windings 216 are connected in series, or preferably in parallel, to the same excitation source.

The device shown in FIG. 3 operates on the same principle as that shown in FIGS. 1, 2a and 2b.

In particular, when no excitation is applied by the windings 216, the three permanent magnets 214 co-operate to produce a magnetic flux circulating almost entirely in the stator, and the phase windings 213a to 213c therefore supply a substantially zero current.

On the other hand, establishment of a current in the reverse direction to the field created by the permanent magnets causes effects of field looping around the different arms of the phase windings, these looping effects being commutated by the teeth 101 of the rotor 100 in a dephased manner to one another in such a way that during the rotation of the rotor the device produces an alternating three-phase current, the mean value of which is zero and the actual value of which varies substantially between zero and a maximum value when the excitation current is varied between zero and a maximal excitation value.

To conclude, it will be observed that the devices shown in FIGS. 1 to 3 may, if necessary, be subjected to an initial magnetization or to a remagnetization.

More specifically, if the magnets 214 are mounted in the stator without having been previously magnetized, it suffices to supply the excitation windings 216 with a reverse current to the excitation current. A circumferential magnetic field is then created in the stator in the same direction as that produced by the permanent magnets, and the field is able to magnetize or to remagnetize the magnets. This establishment of a reverse magnetization or remagnetization field may be achieved for example by semiconductor switching means 220 (FIG. 1) of the kind well-known to a person skilled in the art.

This operation may be performed either with the alternator mounted in the vehicle, with the electrical energy supplied by the battery, or in the workshop during a maintenance operation.

The present invention is not limited to the embodiments described and shown. In particular, it is possible utilizing the same principles, to produce machines operating equally well either as a generator or as a motor, such as for example an alternator-starter motor of an automobile vehicle, and machines having any number of phases.

What is claimed is:

1. An electrical machine comprising:

a stator including on an internal face at least one induction winding housed in a pair of recesses and a series of housings for excitation means;

a rotor without windings and including a plurality of teeth adapted to selectively establish variable magnetic fluxes in the induction windings, the teeth of the rotor being adapted to effect a flux commutation in the stator; and said excitation means including at least one permanent magnet adapted to establish a magnetic flux in a circumferential direction of the stator and at least one excitation winding adapted to that of the flux produced by said permanent magnet, said permanent magnet occupying an angular position located between angular positions of two arms of a common induction winding of said at least one induction winding so as to produce an alternating magnetic flux in the induction winding during rotation of the rotor.

2. The electrical machine according to claim 1, wherein said stator comprises along a periphery an alternating plurality of said permanent magnets and said excitation windings.

3. The electrical machine according to claim 2, wherein said permanent magnet extends substantially over all of a radial width of said stator.

4. The electrical machine according to claim 3, wherein said stator comprises a single body having a recess for said permanent magnet.

5. The electrical machine according to claim 3, wherein said stator comprises a plurality of body parts connected to one another by a plurality of said permanent magnets.

6. The electrical machine according to claim 1, wherein said excitation winding is located in two recesses provided respectively in the internal surface and in the external surface of said stator.

7. The electrical machine according to claim 1, wherein an equal number of said permanent magnets, said excitation windings and said induction windings are provided evenly spaced around a circumference of the stator.

8. The electrical machine according to claim 7, wherein the teeth of the rotor have a different angular distribution to those of said induction windings so as to operate with polyphasic currents in different said induction windings.

9. The electrical machine according to claim 1, further comprising means for establishing with the aid of said excitation winding a reverse magnetic field for magnetization or remagnetization of said permanent magnet.

10. The electrical machine according to claim 1, comprising an automobile vehicle alternator.

11. An apparatus comprising:
  a stator;
  at least one induction winding arranged on an internal face of the stator;
  a rotor including a plurality of teeth to establish variable magnetic fluxes in the induction winding and to effect a flux commutation in the stator;
  at least one magnet arranged in the stator to establish a magnetic flux loop in a circumferential direction of the stator; and
  at least one excitation winding arranged in the stator to establish a magnetic flux in a circumferential direction opposite to that of the magnetic flux produced by the magnet,
  wherein the magnet is arranged between two arms of a common induction winding of said at least one induction winding to produce an alternating magnetic flux in the induction winding during rotation of the rotor.

12. The apparatus according to claim 11, wherein the magnetic flux established by the excitation winding is adjustable.

13. The apparatus according to claim 12, wherein the magnetic flux established by the excitation winding is adjusted by varying current flow to the excitation winding.

14. The apparatus according to claim 11, wherein an equal number of the magnets, the excitation windings and the induction windings are provided evenly spaced around a circumference of the stator.

15. The apparatus according to claim 14, wherein the teeth of the rotor have a different angular distribution to those of the induction windings to operate with polyphasic currents in different induction windings.

16. The apparatus according to claim 11, wherein the stator includes recesses on the internal face of the stator to house the induction winding, the magnet and the excitation winding.

17. The apparatus according to claim 11, comprising an alternator for a motor vehicle.

18. An apparatus comprising:
  a stator;
  at least one induction winding arranged on an internal face of the stator;
  a rotor including a plurality of teeth to establish variable magnetic fluxes in the induction winding and to effect a flux commutation in the stator;
  first means for establishing a magnetic flux loop in a circumferential direction of the stator; and
  second means for establishing a magnetic flux in a circumferential direction opposite to that of the magnetic flux produced by said first means,
  wherein the first means is arranged between two arms of a common induction winding of said at least one induction winding to produce an alternating magnetic flux in the induction winding during rotation of the rotor.

19. The apparatus according to claim 18, wherein the magnetic flux established by said second means is adjustable.

* * * * *